United States Patent
Zacharias et al.

(10) Patent No.: US 6,488,461 B1
(45) Date of Patent: Dec. 3, 2002

(54) INTERLOCKING TWO-PIECE WASHER

(75) Inventors: Darwin L. Zacharias, Saskatoon (CA); Dick E. Friesen, Nepburn (CA)

(73) Assignee: Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 09/892,113

(22) Filed: Jun. 26, 2001

(51) Int. Cl.[7] ............................................. F16B 43/02
(52) U.S. Cl. ......................................................... 411/539
(58) Field of Search ................................. 411/539, 540, 411/531, 546, 521

(56) References Cited

U.S. PATENT DOCUMENTS

| | | | |
|---|---|---|---|
| 1,151,131 A | * | 8/1915 | Starliper |
| 1,288,973 A | * | 12/1918 | Osborn |
| 1,332,626 A | * | 3/1920 | Henegar |
| 1,492,556 A | * | 5/1924 | Gabriel |
| 1,558,364 A | | 10/1925 | Iverson |
| 1,777,614 A | | 10/1930 | Hauger |
| 2,358,606 A | * | 9/1944 | Summers |
| 3,498,642 A | * | 3/1970 | Berger |
| 4,274,323 A | * | 6/1981 | Resnicow |
| 5,836,367 A | | 11/1998 | Calabrese |

* cited by examiner

Primary Examiner—Flemming Saether
(74) Attorney, Agent, or Firm—Larry W. Miller; John William Stader

(57) ABSTRACT

A two-piece washer that can be inserted in a fully or partially assembled shaft structure without the necessity of removing component parts is disclosed. The two identical substantially inflexible pieces each have, on the circumferential ends thereof, a tab and recess that interlock with the corresponding tab and recess on the respective ends of the mating piece. To insert the washer, the mating surfaces of the component parts at the insertion location on the shaft must be separated a distance at least twice the thickness of the washer so that the two pieces of the washer can be placed around the shaft and moved axially along the shaft and relative to each other into the interlocking position.

3 Claims, 2 Drawing Sheets

INTERLOCKING TWO-PIECE WASHER

FIELD OF THE INVENTION

The present invention relates generally to washers used in the assembly of mechanical structures, and particularly to two-piece washers that can be inserted in a mechanical structure after assembly.

BACKGROUND OF THE INVENTION

During and after the process of putting together a mechanical structure it is often discovered that a washer has either been inadvertently left out of the assembly or that a washer should be assembled in order to more precisely adjust the final assembly. This need may arise because of excess play along the shaft or to improve relative rotational movement between component parts. Usually, and under the best of circumstances, the only solution is to disassemble at least part of the structure to allow the washer to be slipped onto the shaft in the proper order of assembly, and then reassemble the remainder of the component parts. Under other circumstances, perhaps where the structure has been welded together, the only solution is to destroy some parts and start the assembly process from the beginning. These are time-consuming processes that cost money and efficiency in a commercial setting, and frustration for the mechanic in all situations.

Solutions to this problem have been proposed, but none have met reasonable commercial acceptance. For instance, U-shaped spacers have been utilized in this application, but these must have some means of being securely locked into place or they can work themselves free of, or out of, the area in which they are meant to remain. Such hardware is relatively expensive to manufacture and less reliable in use than is required in a commercial assembly operation.

Another solution is proposed in U.S. Pat. No. 1,777,614. Generally, the washers described are designed to eliminate axial shifting relative to the shaft while, as will be discussed further below, the washer of the instant invention requires such shifting to move into and out of the interlocking position. In FIG. 5 a two-piece washer, including male and female parts is depicted. The male member has outer ends formed into ratchet teeth and the female member has ends terminating in spring jaws and ratchet teeth that engage with those on the male member. The two pieces are not identical and must be flexed or sprung apart in order to engage each other. Non-identical parts result in a more costly manufacturing requirement, call for greater logistics and packaging, and more difficulty in assembly because of the need to handle two parts. Additionally, the need to flex one or both pieces in order to interlock them is not always possible because of other close-fitting parts or components.

Yet another proposed solution is disclosed in U.S. Pat. No. 1,558,364. There is shown a two-piece structure using identical parts, each with a male end and a female end. However, the female end is bent open for assembly and must be physically bent into a locking position around the male end. The need to bend components makes this possible solution more impractical because, as pointed out above, often there is inadequate space available to insert pliers or other tools to accomplish this end.

It would be desirable and beneficial to provide a washer that would overcome the above-noted disadvantages of known washers.

SUMMARY OF THE INVENTION

It is an object of the instant invention to provide an improved washer that can be easily inserted onto an assembled shaft without the need to disassemble other component parts already fitted to the shaft.

It is another object of the instant invention to provide an improved washer that is more cost-effective, durable, cheap to produce, easier to use, and reliable than those known in the prior art.

It is yet another object of the instant invention to provide an improved washer that can be inserted at substantially any location along the length of a shaft with other component parts thereon without the need to disassemble the structure.

It is a still further object of the instant invention to provide an improved two-piece washer that includes a tab, or tabs, extending outwardly there from adjacent the interlocking elements to aide in the placement or removal of the washer, thus eliminating the need for special tools and the likelihood that parts will be dropped or mishandled during use.

These and other objects are obtained by providing a two-piece washer that can be inserted in a fully or partially assembled shaft structure without the necessity of removing component parts. The two identical substantially inflexible pieces each have, on the circumferential ends thereof, a tab and recess that interlock with the corresponding tab and recess on the respective ends of the mating piece. To insert the washer, the mating surfaces of the component parts at the insertion location on the shaft must be separated a distance at least twice the thickness of the washer so that the two pieces of the washer can be placed around the shaft and moved axially along the shaft and relative to each other into the interlocking position.

The foregoing and other objects, features and advantages of the invention will appear more fully hereinafter from a consideration of the detailed description which follows, in conjunction with the accompanying drawings wherein one primary embodiment of the invention is illustrated by way of example. It is to be expressly understood, however, that the drawings are for illustrative purposes and are not to be construed as defining the limits of the invention.

BRIEF DESCRIPTION OF THE DRAWINGS

The advantages of this invention will become apparent upon consideration of the following detailed description of the invention, especially when taken in conjunction with the accompanying drawings wherein.

DETAILED DESCRIPTION OF THE INVENTION

Figure 1:
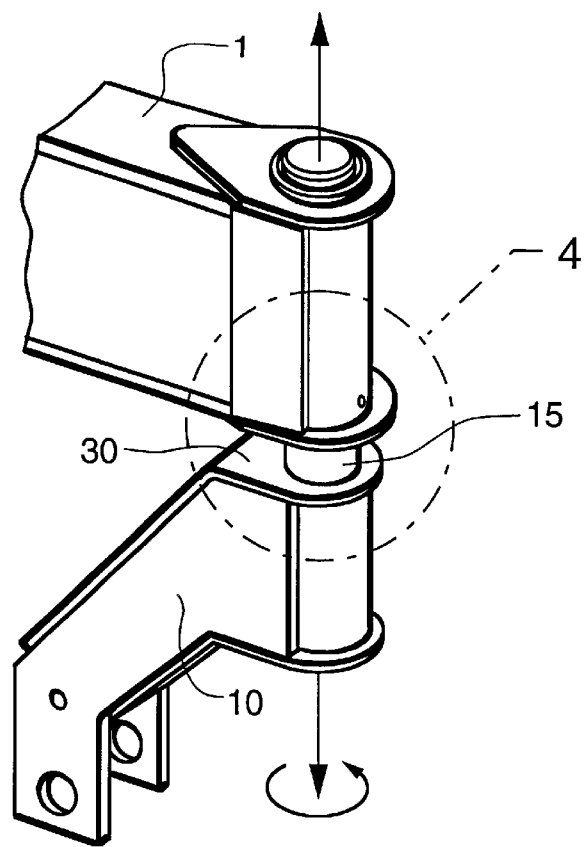
FIG. 1 is a perspective view of a mechanical assembly of they type in which the washer of the instant invention would be useful.

Referring now to the drawings, and particularly FIG. 1, an exemplary assembly of parts is shown in which the washer of the instant invention may find utility. Two primary components, frame 1 and caster 10, are depicted as having been fitted together with shaft 15. In this exemplary structure, the frame could be part of an agricultural machine and the caster could be affixed at the lower end thereof to a wheel. Shaft 15 is not shown in its entirety; however, it would be secured at both ends, perhaps by bolts or perhaps by welding, so that it does not come apart during operation. The shaft would likely also be supported by bearings to ensure smooth rotation.

Figure 3:
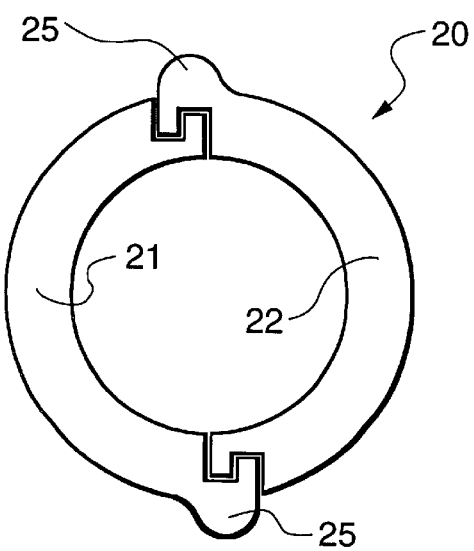
FIG. 3 is a top plan view of the washer of the instant invention, showing the interlocking two-piece construction and an alternative structure.

FIG. 3 also shows an alternative design in which each piece, 21 and 22, has an integral assist tab 24 extending outwardly there from. Assist tab 25 is preferably located adjacent to or in the vicinity of the interlocking tab and recess, so as to form a convenient aide to placing or removing the piece upon the shaft. The assist tab should be relatively small and rounded so as not to become a "catch" point for loose debris that might be in the area.

Figure 2:
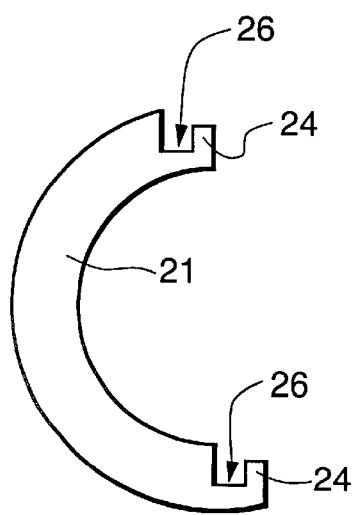
FIG. 2 is a top plan view of one of the two identical elements that make up a washer according to the instant invention.

FIGS. 2 and 3 show the washer 20 in top plan view to be comprised of two identical pieces or members 21 and 22. Each piece is C-shaped, and together the two form an annular disk-like member with a central opening to be fitted around a shaft, such as 15. The ends of each piece are identical and include a tab 24 and a recess 26. Thus, when the two pieces are interlocked, as will be discussed further below, the respective tabs on mating ends of the pieces fit securely in the recesses of the ends of the mating piece.

The washer 20 may be conveniently manufactured in various thicknesses as may be required and with different diameter central openings to accommodate shafts of different diameters. The single part could be manufactured in several alternative processes; however, the most cost-effective would likely be a single stamping process.

Figure 4:
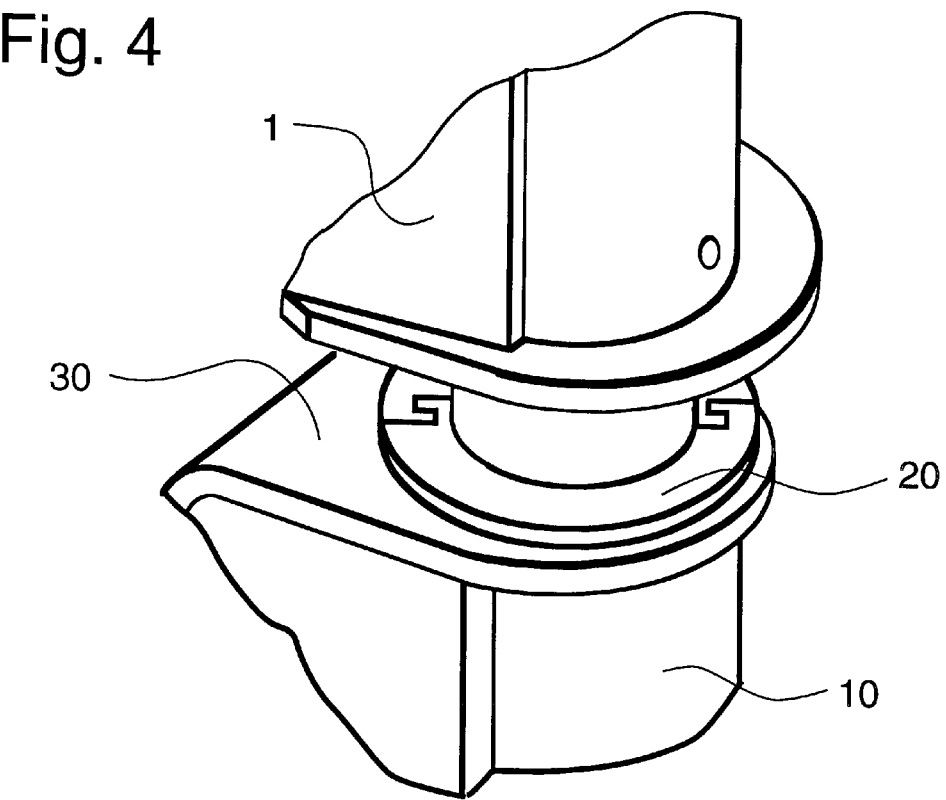
FIG. 4 is an enlarged perspective view of the circled area 3 from FIG. 1, with the addition of the washer of the instant invention.
Figure 5:
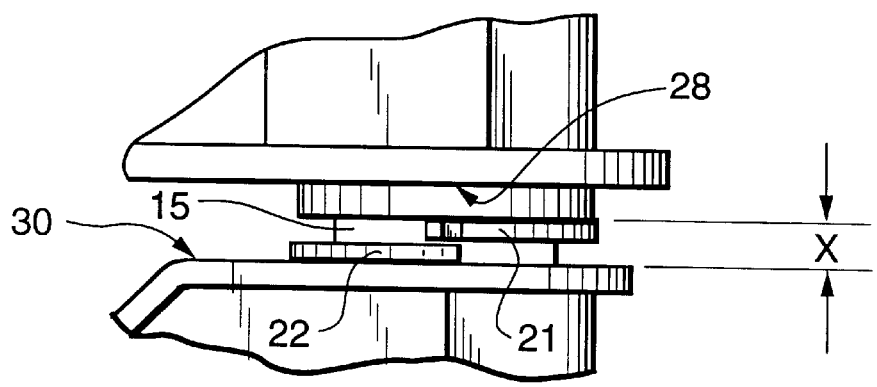
FIG. 5 is a partial, enlarged side elevational view of FIG. 4, showing the two pieces of the washer before they are interlocked together.

In any assembly of parts about a shaft, the adjacent component parts will have mating surfaces. For example, referring to FIGS. 1, 4 and 5, frame member 1 has a mating surface 28, seen clearly only in FIG. 4, and caster 10 has an opposing mating surface 30. Since the ends of the washer 20 interlock only by bringing the pieces into the locking position in the same plane, there must be spacing, X, between the mating surfaces equal to twice the thickness of the washer 20. This can best be seen in FIG. 5 which shows piece 22 on surface 30 and piece 21 further above axially on shaft 15 about to be moved into the interlocking position, i.e., into the same plane as piece 22, with the tabs and recesses engaged as shown in FIGS. 3 and 4. Once the pieces are in the interlocking position, the mating surfaces should be moved toward each other and into contact with the washer to securely lock the washer in position, thus safeguarding against accidental release.

Though there are suitable composite materials, and materials displaying some flexibility will work satisfactorily, such as, for example, Nylatron®, it is contemplated that the washer 20 will be made of a rigid generally inflexible material, such as metal, so that it will have superior wear and durability characteristics and will, under no circumstances spring apart and fall out of the assembly.

Having thus described the invention, what is claimed is:

1. A washer comprising:

two identical C-shaped elements made of a inflexible metallic material, each element having a tab and recess on each end thereof interlocking the respective ends of said elements to form an annular generally flat disk with a central opening, and an assist tab, integral with said C-shaped element and generally rounded in the top plan view, extending in a direction generally outwardly from said central opening generally adjacent said tab and recess;

said tabs and recesses are shaped such that said interlocking can only be effected around an elongated shaft with a longitudinal diameter the general size of said central opening by relative movement of said elements along the longitudinal axis of said shaft.

2. A washer comprising:

two identical generally C-shaped elements made of a inflexible metallic material, each with two circumferential interlocking ends forming a circular flat disk with a central opening and each said element including a generally rounded, in top plan view, assist tab integral with each element and extending in a direction generally outwardly from said central opening generally adjacent said tab and recess; said interlocking ends each including a tab and a recess shaped such that the tabs securely engage the recesses on mating elements without flexing of either element.

3. In a mechanical structure including two mating surfaces joined by a sliding shaft with a longitudinal axis, the improvement comprising:

two identical C-shaped inflexible metallic elements, each element having a tab and recess on each end thereof interlocking the respective ends of said two elements to form an annular generally flat disk with a central opening, each said element further including a generally rounded, in top plan view, assist tab extending in a direction generally outwardly from said central opening, each said assist tab is integral with a respective element and extending outwardly generally adjacent said tab and recess;

said shaft extends through said central opening and said disk is positioned between said two mating surfaces; and said tabs and recesses are shaped such that said interlocking can only be effected around said shaft by relative movement of said elements along said longitudinal axis of said shaft.

* * * * *